(12) United States Patent
Bocsanyi et al.

(10) Patent No.: US 8,794,707 B2
(45) Date of Patent: Aug. 5, 2014

(54) ADJUSTING DEVICE FOR A SEAT AND METHOD OF OPERATING AN ADJUSTING DEVICE

(75) Inventors: Berthold Bocsanyi, Leinburg (DE); Erich Dörfler, Landsberg (DE)

(73) Assignee: L&P Swiss Holding AG, Wittenbach (CH)

( * ) Notice: Subject to any disclaimer, the term of this patent is extended or adjusted under 35 U.S.C. 154(b) by 543 days.

(21) Appl. No.: 13/028,985

(22) Filed: Feb. 16, 2011

(65) Prior Publication Data

US 2011/0227388 A1    Sep. 22, 2011

(30) Foreign Application Priority Data

Feb. 17, 2010   (EP) ..................................... 10001615

(51) Int. Cl.
*A47C 7/02*    (2006.01)
(52) U.S. Cl.
USPC ............... 297/452.41; 297/284.6; 297/DIG. 3
(58) Field of Classification Search
USPC ....... 297/284.6, 452.41, DIG. 3; 60/407, 409, 60/413, 484, 412, 368; 137/596.17; 417/505
See application file for complete search history.

(56) References Cited

U.S. PATENT DOCUMENTS

| | | | | |
|---|---|---|---|---|
| 3,886,848 A | * | 6/1975 | Budecker et al. ............... | 91/516 |
| 4,516,788 A | * | 5/1985 | Umetsu et al. ............. | 280/6.157 |
| 4,592,588 A | | 6/1986 | Isono et al. | |
| 4,792,186 A | * | 12/1988 | Benjamin et al. .......... | 297/284.6 |
| 4,807,931 A | * | 2/1989 | Ishida et al. ................ | 297/284.6 |
| 4,938,528 A | * | 7/1990 | Scott ........................... | 297/284.6 |
| 5,113,655 A | * | 5/1992 | Schumacher et al. .......... | 60/408 |
| 5,605,043 A | * | 2/1997 | Dimmock ........................ | 60/407 |
| 5,638,676 A | * | 6/1997 | Muller ............................ | 60/407 |
| 5,666,809 A | * | 9/1997 | Mentink ......................... | 60/484 |
| 5,692,376 A | * | 12/1997 | Miki et al. ...................... | 60/328 |
| 5,860,699 A | * | 1/1999 | Weeks ....................... | 297/284.6 |
| 5,893,609 A | * | 4/1999 | Schmidt ..................... | 297/284.6 |
| 6,098,000 A | | 8/2000 | Long et al. | |
| 6,427,538 B1 | | 8/2002 | Potter | |
| 6,988,508 B2 | * | 1/2006 | Bauer et al. ................... | 137/106 |

(Continued)

FOREIGN PATENT DOCUMENTS

| | | |
|---|---|---|
| DE | 3505088 | 11/1986 |
| DE | 19927403 | 1/2001 |
| DE | 10063478 | 7/2002 |
| DE | 102004060027 | 6/2006 |

(Continued)

OTHER PUBLICATIONS

Extended European Search Report and Opinion, European Patent Application No. EP 10 00 1615.3, dated Sep. 29, 2010.

*Primary Examiner* — David R Dunn
*Assistant Examiner* — Alexander Harrison
(74) *Attorney, Agent, or Firm* — Michael Best & Friedrich LLP

(57) ABSTRACT

An adjusting device for a seat comprises at least one fluid chamber and a valve assembly in fluid communication with the fluid chamber. Each fluid chamber is configured to be installed in the seat to adjust at least a portion of the seat upon inflation or deflation. The at least one fluid chamber comprises a first fluid chamber. The valve assembly comprises a check valve and a 3/2-way valve. A first port of the 3/2-way valve is in fluid communication with the check valve, and a second port of the 3/2-way valve is in fluid communication with the first fluid chamber.

15 Claims, 7 Drawing Sheets

(56) References Cited

U.S. PATENT DOCUMENTS

| | | | |
|---|---|---|---|
| 7,574,859 B2 * | 8/2009 | Epshteyn | 60/413 |
| 7,604,292 B1 * | 10/2009 | Reading | 297/215.12 |
| 2001/0004443 A1 * | 6/2001 | Behmenburg et al. | 417/302 |
| 2005/0050886 A1 * | 3/2005 | Bauer et al. | 60/413 |
| 2005/0067868 A1 * | 3/2005 | Kern et al. | 297/284.6 |
| 2005/0242644 A1 | 11/2005 | Bauer et al. | |
| 2013/0062920 A1 * | 3/2013 | McDiarmid | 297/284.6 |

FOREIGN PATENT DOCUMENTS

| | | |
|---|---|---|
| DE | 102005060217 | 7/2006 |
| DE | 102006009052 | 8/2006 |
| DE | 102007009891 | 9/2008 |
| EP | 1072465 | 1/2001 |
| EP | 1988440 | 11/2008 |
| FR | 2731961 | 9/1996 |
| GB | 2080973 | 2/1982 |

* cited by examiner

ADJUSTING DEVICE FOR A SEAT AND METHOD OF OPERATING AN ADJUSTING DEVICE

CROSS REFERENCE TO RELATED APPLICATIONS

This application claims the benefit of and priority to European Patent Application No. 10001615.3, filed Feb. 17, 2010, the entire contents of which are incorporated herein by reference.

The invention relates to a seat adjusting device and a method of operating a seat adjusting device. The invention relates in particular to a device and method that allow one or plural portions of a seat, in particular of a vehicle seat, to be pneumatically adjusted.

Lumbar supports or other adjustable supports are frequently provided in seats to enhance, for example, a driver's or passenger's comfort. Lumbar support devices are provided in backrests in order to provide adequate support in the lumbar vertebral or lordosis region of a person sitting on the seat by forming a suitable support surface. Some implementations of lumbar support devices are based on mechanically moveable components. Other implementations of lumbar support devices utilize one or plural inflatable fluid chambers. The fluid chambers may be configured as inflatable cushions or bladders that change their shape and/or size in dependence on an amount of fluid contained therein. Examples for such lumbar support devices are described, for example in EP 1 072 465 A1 or in DE 100 63 478 A1. An adjustment of the lumbar support may be effected by means of a pressure source and a suitably configured pneumatic circuit comprising valves and connecting members, such as hoses. Lumbar support devices that utilize more than one inflatable fluid chamber allow a user to change the curvature of a portion of the backrest. Additionally, the position of the apex along the longitudinal axis of the backrest may be controlled. Such as lumbar support device is also referred to as four-way-lumbar support device. Other adjustable supports for seats, for example, adjustable side bolsters, have been described in which the side bolsters are pneumatically adjusted. An example of such an adjusting device is described in DE 10 2007 009 891 A1.

The integration of an increasing number of adjustable components into a seat enhances sitting comfort. On the other hand, installation space available in the seat is limited. Further, the integration of an increasing number of actuators and associated componentry required to couple the actuator to a mechanically or pneumatically adjustable member leads to an increase of assembly time and, thus, assembly costs. The assembly time and costs generally increases with the increasing number of components. For various conventional adjusting devices that utilize inflatable fluid chambers one or plural electromagnetically actuable valves are provided. Frequently, the pneumatic circuit may be configured such that, for each inflatable fluid chamber, fluid that is introduced into the fluid chamber passes at least two electrically actuable valves on its way to the respective chamber. The pneumatic circuit then has to be implemented with a correspondingly large number of electrically actuable valves. While such constructions may have the benefit that the pressure in each fluid chamber may be controlled fully independently of the pressure in each other fluid chamber, they may be costly in terms of installation space and assembly time.

There is a continued need in the art for improved seat adjusting devices and methods of operating a seat adjusting device. In particular, there is a continued need in the art for seat adjusting devices which have one or plural inflatable fluid chambers, in which the componentry for adjusting a fluid pressure in the fluid chambers may be provided in a compact installation space. There is also a need in the art for methods of operating seat adjusting devices which have one or plural inflatable fluid chambers, in which the componentry for adjusting a fluid pressure in the fluid chambers may be provided in a compact installation space.

According to the invention, this need is addressed by an adjusting device and a method as defined by the independent claims. The dependent claims define preferred or advantageous embodiments.

According to an aspect, an adjusting device for a seat, in particular for a vehicle seat, is provided. The adjusting device comprises at least one fluid chamber and a valve assembly in fluid communication with the at least one fluid chamber. Each fluid chamber of the at least one fluid chamber is configured to be installed in the seat to adjust at least a portion of the seat, and each fluid chamber of the at least one fluid chamber is inflatable. The at least one fluid chamber comprises a first fluid chamber. The valve assembly comprises a check valve and a 3/2-way valve. A first port of the 3/2-way valve is in fluid communication with the check valve and a second port of the 3/2-way valve is in fluid communication with the first fluid chamber.

In the adjusting device, inflation and deflation of the first fluid chamber may be controlled by actuating a pressure fluid source and the 3/2-way valve. The 3/2-way valve, which has three ports and two valve positions, may be implemented using one solenoid. Thereby, the installation space required for the adjusting device may be kept compact. The check valve prevents an undesired escape of fluid from the first fluid chamber when the 3/2-way valve is in a position in which fluid is allowed to pass between the first and second ports of the 3/2-way valve, and thereby allows a pressure to be maintained in the first fluid chamber.

The fluid may be a gas, in particular air.

The inflatable fluid chamber(s) may have any configuration that allows a shape and/or volume of the fluid chamber(s) to be changed when an amount of fluid introduced thereinto is adjusted. Examples of inflatable fluid chamber(s) include bladders or air cushions formed of a resilient material. A fluid chamber may also comprise plural bladders or air cushions that are connected to one 3/2-way valve.

The second port of the 3/2-way valve may be directly coupled to the first fluid chamber via a fluid line. The direct coupling may be implemented such that fluid output via the second port of the 3/2-way valve does not pass another valve upon passage to the first fluid chamber.

The adjusting device may comprise a pressure fluid source which has a housing. An output port of the pressure fluid source may be in fluid communication with the check valve. The valve assembly may be arranged in an interior of the housing. Thereby, an integral unit including both the pressure fluid source and the valve assembly may be formed. The reduced number of components simplifies assembly of the adjusting device on the seat.

The pressure fluid source may in particular be a pump. The valve assembly may be integrated into a pump head. Thereby, it is not necessary to provide separate fluid lines to guide the fluid, e.g., air, from an output of the pump to the valve assembly.

The adjusting device may comprise an electrical control circuit having an input to receive a signal. The control circuit may be coupled to the pressure fluid source and to the valve assembly and may be configured to control the pressure fluid source and the valve assembly in response to the received signal. The control circuit may be arranged in the interior of the housing. Thereby, mounting the adjusting device on the seat may be further simplified.

The control circuit may be configured to retrieve pressure signals indicating a current pressure in each one of the fluid chambers, and to control the pressure fluid source and the valve assembly in response to the received signal and the retrieved pressure signals. Alternatively or additionally, the control circuit may comprise a memory having stored therein information on at least one pressure setting for the fluid chambers. In this case, the control circuit may be configured to retrieve the information from the memory and to control the pressure fluid source and the valve assembly in dependence on the information retrieved from the memory.

The adjusting device may comprise an electrical connector having a connector housing. The connector housing may be formed as a portion of the housing of the pressure fluid source. Thereby, mounting the adjusting device on the seat may be further simplified.

The connector may further include at least one connector pin. The at least one connector housing may be defined by a recess in the housing of the pressure fluid source, into which the at least one connector pin extends. The recess may be configured to matingly receive a mating plug. Thereby, an electrical connection with the control circuit may be conveniently established.

The at least one connector pin may extend at an axial end face of the housing of the fluid pressure source. The at least one connector pin may extend essentially parallel to a longitudinal axis of the housing of the fluid pressure source. For illustration, the at least one connector pin may be provided at a top cap of a pump housing and may extend through the top cap in a direction essentially perpendicularly to an end face of the housing. Thereby, the at least one connector pin may be provided at a position where it is easily accessible during installation.

A fluid line connector or plural fluid line connectors may be provided at the axial end face at which the connector is provided. The connector and the fluid line connector(s) may be configured such that an electrical line and fluid line(s) may extend from the axial end face in the same direction. Thereby, the required connections may be conveniently established.

The 3/2-way valve may have a third port for discharging fluid from the first inflatable fluid chamber. The third port may be arranged in the interior of the housing to discharge the fluid from the first inflatable fluid chamber into the housing. Thereby, a fluid flow within the housing, e.g., within the pump head, may be established when one of the fluid chambers is deflated. The fluid flow within the housing may assist in cooling the 3/2-way valve.

The adjusting device may comprise a fluid line connector provided on the second port of the 3/2-way valve. The adjusting device may further comprise a fluid line having a first end coupled to the fluid line connector and a second end coupled to the first fluid chamber. The fluid line connector may be provided at an axial end face of the housing of the pressure fluid source. An axial end face of the housing of the pressure fluid source may have a recess, for example a cut-out, and the fluid line connector may be arranged at the recess. The fluid line connector may extend through the recess. Thereby, the fluid line connector may be provided at a position where it is easily accessible during installation.

The housing of the pressure fluid source may be configured such that it includes a securing device which secures the fluid line on the fluid line connector. The securing device may be configured to releasably secure the fluid line on the fluid line connector. The securing device may include at least one hook and/or at least one claw configured to engage the fluid line. Additionally, the securing device may include an disengagement member which is configured to disengage the at least one hook and/or the at least one claw from the fluid line, to allow the fluid line to be removed from the fluid line connector. The disengagement member may be implemented as a ring which is moveable so as to disengage the at least one hook and/or the at least one claw from the fluid line when the ring is moved in a first direction.

The housing of the pressure fluid source with the valve assembly integrated therein may be encapsulated in a shell of foam material. The shell may have passages for fluid lines and electrical lines to be connected to the pressure fluid source and the valve assembly. Thereby, a protection of the integrally formed pressure fluid source and valve assembly may be provided. Further, noise emerging from the pressure fluid source and the valve assembly may be attenuated.

The 3/2-way valve may be electrically actuable. The adjusting device may comprises a fluid guide device configured to direct fluid discharged via the third port of the 3/2-way valve along a portion of the 3/2-way valve at which power is dissipated when the 3/2-way valve is actuated. Thereby, the 3/2-way valve may be cooled when electrical power is supplied to the 3/2-way valve and while fluid is discharged from the first fluid chamber.

The adjusting device may comprise a pressure sensor arranged to sense a pressure at the second port of the 3/2-way valve. If the adjusting device includes a control circuit, the pressure sensor may be provided on, or otherwise coupled to, a circuit board on which the control circuit is provided. Thereby, control functions may be implemented in which the control circuit controls the valve assembly and the pressure fluid source in dependence on current pressure values within the fluid chambers.

The pressure sensor may be provided in the interior of the housing of the pressure fluid source. Thereby, mounting the adjusting device on the seat may be further simplified.

While components of the adjusting device have been described with regard to the pneumatic circuit components that are associated with the first fluid chamber, if the adjusting device includes plural fluid chambers, the pneumatic circuit may include a respective 3/2-way valve for each one of the inflatable fluid chambers. The pneumatic circuit may further include a respective check valve connected in series with the respective 3/2-way valve for each one of the inflatable fluid chambers. The valve assembly may then have a plurality of series connections of a check valve and a 3/2-way valve, with the various series connections being connected parallel to each other, and with each one of the series connections of a check valve and a 3/2-way valve being configured to supply fluid to only one of the plural fluid chambers. For each one of the 3/2-way valves, there may be a fluid line connector provided at the second port of the 3/2-way valve. The fluid line connectors may extend from the same face of the housing of the pressure fluid source, e.g., from an axial end face of the housing of the pressure fluid source.

The check valves may be in fluid communication with a fluid supply passage and may be provided such that fluid is allowed to flow from the fluid supply passage to the respective 3/2-way valve, while a fluid flow in the reverse direction is suppressed. Thereby, an exchange of fluid between fluid chambers connected to different 3/2-way valves may be prevented.

The at least one fluid chamber may comprises a second fluid chamber. The valve assembly may then comprise a further check valve and a further 3/2-way valve. A first port of the further 3/2-way valve may be in fluid communication with the further check valve and a second port of the further 3/2-way valve may be in fluid communication with the second inflatable fluid chamber. By providing plural fluid chambers, an adjusting device having a larger number of degrees of freedom may be realized. For illustration, with two fluid chambers, a four-way lumbar support may be implemented. For further illustration, with two fluid chambers, a side bolster support device may be implemented which allows the side bolsters to be adjusted and in which an exchange of fluid between the first and second fluid chambers provided at opposing sides of the seat may be prevented.

The 3/2-way valve may comprise one solenoid having a yoke, and the further 3/2-way valve may comprise one further solenoid having a further yoke. The yoke and the further yoke may be configured to have a C-shape in which the magnet coil of the solenoid and the further solenoid, respectively, is supported. The yoke and the further yoke may serve as a heat sink when a magnet coil is energized.

The adjusting device may be configured such that heat is transferred between the yoke and the further yoke when one of the 3/2-way valve and the further 3/2-way valve is actuated. Thereby, excessive local temperature increases in only one area, e.g. within a pump housing, may be prevented.

The adjusting device may comprise a heat transfer member on which both the yoke and the further yoke abut. The heat transfer member may have a plate-shape. The heat transfer member may be a portion of a board configured to have a high heat conductivity. In an embodiment, the heat transfer member may be a portion of a circuit board. On another portion of the circuit board, the control circuit may be provided.

In further implementations, the 3/2-way valve and/or the further 3/2-way valve may be an electrically actuable valve which includes an actuator different from a solenoid. Examples for such valves include 3/2-way valves having a piezo-electric actuator, memory-wire actuated 3/2-way valves, or 3/2-way valves having an actuator which includes one or plural plastic materials which are responsive to an electrical signal, e.g., by changing their shape or volume responsive to an applied voltage or current.

The adjusting device may be configured as at least one of a lumbar support, a four-way lumbar support, or a side bolster support. This may be attained by providing a suitable number and arrangement of fluid chambers. For illustration, the adjusting device may have one inflatable chamber provided in a lower portion of the backrest of the seat to implement a two-way lumbar support device. The adjusting device may have two inflatable chambers provided in a lower portion of the backrest of the seat, which are offset relative to each other along the longitudinal direction of the backrest, to implement a four-way lumbar support device. The adjusting device may have two inflatable chambers provided at left and right side bolsters of the seat portion or the backrest portion of the seat to implement an adjustable side bolster support device. The two inflatable chambers may be in fluid communication with different 3/2-way valves, to allow one of the side bolsters to be inflated while the other is deflated or similar. The two inflatable chambers may also be in fluid communication with only one 3/2-way valve if it is only desired to inflate or deflate the two side bolsters in a symmetrical manner.

Various combinations of the above arrangements of fluid chambers may also be implemented. For illustration, the adjusting device may have one fluid chamber provided in a lower backrest portion of the seat which is coupled to a first 3/2-way valve of the valve assembly, and two fluid chambers provided in side bolsters of the seat which are coupled to a second 3/2-way valve of the valve assembly. Thereby, a two-way lumbar support device and an adjustable side bolster support are provided, which may be actuated via one integral pump and valve assembly.

According to another aspect of the invention, a seat, in particular a vehicle seat, is provided, which comprises the adjusting device according to any one aspect or embodiment described herein.

According to another aspect, a method of operating an adjusting device for a seat, in particular for a vehicle seat, is provided. The adjusting device comprises at least one inflatable fluid chamber installed in the seat and a valve assembly in fluid communication with the at least one fluid chamber. The at least one inflatable fluid chamber comprises a first inflatable fluid chamber. In the method, a pressure fluid source and the valve assembly are controlled in dependence on whether the first fluid chamber is to be inflated or deflated. If the first fluid chamber is to be inflated, the pressure fluid source is actuated to supply fluid to the first fluid chamber via a check valve and a 3/2-way valve of the valve assembly. If the first fluid chamber is to be deflated, electrical power is supplied to the 3/2-way valve to actuate the 3/2-way valve such that fluid is discharged to atmosphere from the first fluid chamber via the 3/2-way valve.

In the method, inflation and deflation of the first fluid chamber may be controlled by actuating a pressure fluid source and the 3/2-way valve. The 3/2-way valve, which has three ports and two valve positions, may be implemented using one solenoid. Thereby, the installation space required for the adjusting device may be kept compact.

In the method, the adjusting device may be operated such that no electrical power is supplied to the 3/2-way valve while inflating the first fluid chamber. In the method, the adjusting device may be operated such that no electrical power is supplied to the 3/2-way valve while maintaining an established pressure in the first fluid chamber.

The at least one inflatable fluid chamber may comprise a second inflatable fluid chamber. The valve assembly may comprise a further check valve and a further 3/2-way valve in fluid communication with the second inflatable fluid chamber. Then, the adjusting device may also be operated depending on whether one of the fluid chambers is to be inflated while the other one is to be simultaneously deflated. If one of the first and second fluid chambers is to be inflated while the other one of the first and second fluid chamber is to be simultaneously deflated, the pressure fluid source may be actuated to supply fluid to the one of the first and second fluid chambers which is to be inflated. Electrical power may be supplied to only the one of the 3/2-way valve and the further 3/2-way valve which is in fluid communication with the other one of the first and second fluid chambers, i.e., the fluid chamber which is to be deflated.

The method may be performed by operating an adjusting device according to any one aspect or embodiment described herein.

According to another aspect of the invention, an integral pump and valve assembly device is provided, which is configured to supply fluid to at least one fluid chamber of an adjusting device. The integral pump and valve assembly device includes a pump, a valve assembly having at least one 3/2-way valve and a housing in which both the pump and the valve assembly are arranged. The at least one 3/2-way valve has a first port to receive pressure fluid from the pump, a second port to supply the received pressure fluid to a fluid chamber of the at least one fluid chamber when the 3/2-way valve is in a first position, and a third port to discharge fluid to atmosphere when the 3/2-way valve is in a second position.

By forming an integral pump and valve device, the number of components that have to be mounted in a seat may be kept small, which simplifies assembly.

The integral pump and valve assembly device may be configured such that the valve assembly is arranged in a pump head.

The valve assembly of the integral pump and valve assembly device may include a further 3/2-way valve. The valve assembly may further include a check valve and a further check valve that are respectively in fluid communication with an output port of the pump. The check valve may be configured to allow fluid to pass from the output port of the pump to the first port of the 3/2-way valve while preventing fluid flow in the reverse direction. The further check valve may be configured to allow fluid to pass from the output port of the pump to a first port of the further 3/2-way valve while preventing fluid flow in the reverse direction.

The integral pump and valve assembly device may be configured to supply fluid to the at least one fluid chamber in the adjusting device according to any one aspect or embodiment of the invention.

The devices and methods according to various aspects and embodiments may be utilized for adjusting components of a seat. For illustration, the devices and methods may be applied to a lumbar support device, e.g., a two-way lumbar support or a four-way lumbar support, a side bolster support device or combinations thereof.

Embodiments of the invention will be described with reference to the accompanying drawings.

Exemplary embodiments of the invention will now be described with reference to the drawings. While some embodiments will be described in the context of specific fields of application, such as in the context of automotive vehicle seating, the embodiments are not limited to this field of application. Further, the features of the various embodiments may be combined with each other unless specifically noted otherwise.

Figure 1:
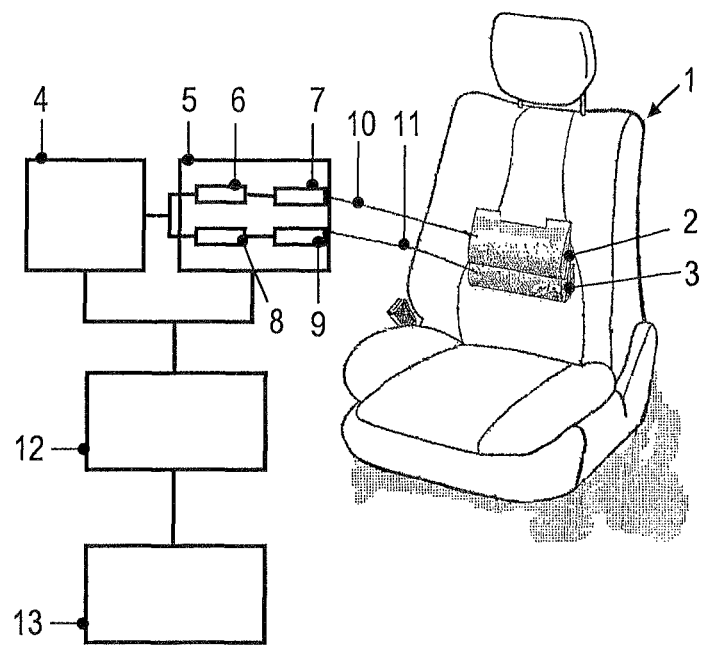
FIG. 1 is a schematic view of a seat having an adjusting device according to an embodiment.

FIG. 1 is a schematic view of a vehicle seat 1 having an adjusting device according to an embodiment. The adjusting device is illustrated to be a four-way lumbar support device. The lumbar support device includes inflatable fluid chambers, which are configured as a first inflatable bladder 2 and a second inflatable bladder 3. The first and second bladders 2 and 3 are configured to change their exterior dimensions when a gas pressure in the respective bladder is adjusted. The first and second bladders 2 and 3 are provided at a lower portion of the backrest of the vehicle seat 1 and are offset relative to each other in a longitudinal direction of the backrest. By inflating or deflating both bladders 2 and 3, the amount of curvature in the lower backrest portion may be adjusted. By inflating one of the bladders while deflating the other one, the apex position may be shifted. Thereby, a four-way lumbar support device may be implemented. While a lumbar support device is illustrated in FIG. 1, the bladders 2 and 3 may also be provided at other positions of the seat. For illustration, the bladders 2 and 3 may also be provided in side bolster portions of the seat to implement a side bolster support device.

The adjusting device further includes a pressure fluid source 4, a valve assembly 5, a control circuit 12 and a control device 13. The pressure fluid source 4 is configured to provide a pressure fluid, in particular a gas, to the valve assembly 5. The pressure fluid source 4 may include a pump which supplies gas to a supply passage, from which the gas is provided to the valve assembly 5. The valve assembly 5 is configured to receive the gas provided by the pressure fluid source 4 and to supply the gas to the first bladder and/or the second bladder. As will be described in more detail with reference to FIGS. 2-9, the valve assembly is controllable such that: gas may be simultaneously supplied to both bladders 2 and 3 via the valve assembly 5; gas may be simultaneously discharged from both bladders 2 and 3 to atmosphere via the valve assembly 5; or gas may be supplied to one of the bladders 2 and 3 while gas is simultaneously discharged from the other one of bladders 2 and 3.

The valve assembly 5 includes a first check valve 6 and a first 3/2-way valve 7 in fluid communication with the first check valve 6. A first fluid line 10 connects the first 3/2-way valve 7 to the first bladder 2. The valve assembly 5 includes a second check valve 8 and a second 3/2-way valve 9 in fluid communication with the second check valve 8. A second fluid line 11 connects the second 3/2-way valve 9 to the second bladder 3. The check valves 6 and 8 may be implemented as passive valves. As will be described in more detail with reference to FIGS. 2-9, the 3/2-way valves may respectively be implemented as electrically controllable 3/2-way valves. For illustration, the 3/2-way valves may be electromagnetically actuable valves, without being restricted to this implementation. For illustration, each one of the 3/2-way valves 7 and 9 may have an actuator which includes an electrically controllable member selected from a group comprising a solenoid, a piezo-electric element, a memory wire, and a plastic material which is responsive to a voltage or current signal. For each one of the bladders 2, 3, only one electrically controllable valve is provided in the pneumatic components of the pneumatic circuit through which the gas passes on its way from the pressure fluid source 4 to one of the bladders 2, 3. If the 3/2-way valves 7 and 9 are implemented as electromagnetically actuable 3/2-way valves, only one solenoid has to be provided in the pneumatic components of the pneumatic circuit through which the gas passes on its way from the pressure fluid source 4 to one of the bladders 2, 3.

The control circuit 12 is electrically coupled to the pressure fluid source 4 and the valve assembly 5 to control the pressure fluid source 4 and the valve assembly 5. The control circuit 12 may control the amount of gas supplied by the pressure fluid source 4 by actuating the pressure fluid source 4 or stopping actuation of the pressure fluid source 4. The control circuit 12 may also control the 3/2-way valves 7 and 9, respectively. In particular, the control circuit 12 may control when and for which period of time the solenoids of the 3/2-way valves 7 and 9 are energized. Additional functionalities may be provided in the control circuit 12. For illustration, if pressure sensors are provided in the valve assembly 5 to sense a gas pressure in the first bladder 2 and the second bladder 3, the control circuit 12 may be coupled to the pressure sensors to retrieve the measured pressure values therefrom. The control circuit 12 may then control the actuation of the pressure fluid source 4 and of valves in the valve assembly 5 in dependence on the measured pressure values. Additionally or alternatively, the control circuit 12 may include a memory in which predefined pressure settings or predefined actuation patterns are stored. The control circuit may then control the pressure fluid source 4 and the valve assembly 5 in dependence on the predefined pressure settings and/or in dependence on the predefined actuation patterns.

The control device 13 may be a control device that allows a user to select one of plural actions. For illustration, the control device 13 may be a manual control device having at least four positions that correspond to "increase curvature", "decrease curvature", "shift apex upward" and "shift apex downward". The control device 13 may include one or plural rocker switches. The control circuit 12 is coupled to the control device 13 to receive a signal indicative of a desired action and controls the pressure fluid source 4 and the valve assembly 5 responsive to the signal. Alternatively or additionally, the control circuit 12 may also be coupled to a vehicle board network to receive therefrom a command indicative of a desired adjustment of the lumbar support bladders 2 and 3.

While the pressure fluid source 4, the valve assembly 5 and the control circuit 12 are illustrated as separate functional blocks in FIG. 1, the pressure fluid source 4, the valve assembly 5 and the control circuit 12 may be formed as an integral unit provided in a common housing, as will be explained in more detail with reference to FIGS. 3-9. While the pressure fluid source 4, the valve assembly 5 and the control circuit 12 are schematically illustrated as entities that are remote from the seat 1, the pressure fluid source 4, the valve assembly 5 and the control circuit 12 may, and frequently will, be installed in the seat 1 itself.

Figure 2:
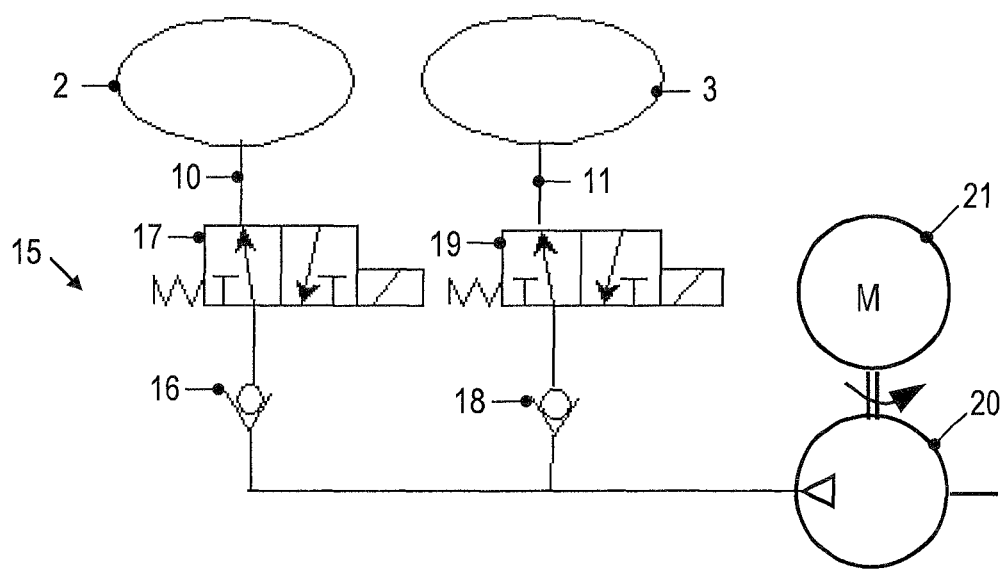
FIG. 2 is a pneumatic circuit diagram of the adjusting device according to an embodiment.

FIG. 2 is a pneumatic circuit diagram of an adjusting device according to an embodiment. The pneumatic circuit of the adjusting device of FIG. 1 may be implemented as illustrated in FIG. 2.

The adjusting device includes a first bladder 2 and a second bladder 3, a valve assembly 15 and a pump including a compressor 20 and motor 21. The valve assembly 15 includes a first check valve 16 and a first 3/2-way valve 17 in a series configuration. The valve assembly 15 further includes a second check valve 18 and a sec- and 3/2-way valve 19 in a series configuration. The first check valve 16 is configured to allow gas to pass from the pump to the first 3/2-way valve 17, and the second check valve 17 is configured to allow gas to pass from the pump to the second 3/2-way valve 19. In the illustrated implementation, the 3/2-way valves 17 and 19 respectively are electromagnetic valves having a first position and a second position. Alternative implementations of 3/2-way valves may be used in other embodiments. The 3/2-way valves 17, 19 may respectively be actuated by energizing the solenoid of the valve. The 3/2-way valves 17 and 19 respectively have a first port, which will also be referred to as input port and which is coupled to a check valve to receive gas from the pump; a second port, which will also be referred to as supply port and which is coupled to an inflatable fluid chamber; and a third port, which will also be referred to as exhaust port and which allows fluid to be discharged to atmosphere. The 3/2-way valves 17 and 19 are respectively configured such that, in the rest position in which the solenoid is not energized, gas may pass through the valve between the first port and the second port, while the third port is kept closed. The 3/2-way valves 17 and 19, respectively, are further configured such that, in the actuated position in which the solenoid is energized, the third port is opened and gas is allowed to pass at least between the second port and the third port. It is not required, although possible, that the 3/2-way valves 17 and 19, respectively, are configured such that the first port is closed when the solenoid is energized.

The operation of the adjusting device illustrated in FIG. 2 will be described next. When a pressure that has previously been established is to be maintained in both bladders 2 and 3, the pump is not actuated and the two 3/2-way valves 17 and 19 are not actuated. The first 3/2-way valve 17 and the first check valve 16 prevent fluid from escaping from the first bladder 2. Similarly, the second 3/2-way valve 19 and the second check valve 18 prevent fluid from escaping from the second bladder 3. The check valves 16 and 18 prevent an exchange of gas between the bladders 2 and 3.

When an amount of gas is to be increased in both bladders 2 and 3, i.e., when both bladders 2 and 3 are to be inflated, the pump is actuated while the two 3/2-way valves 17 and 19 are not actuated. Gas is then supplied to the bladders 2 and 3 via the valve assembly 15. If the two bladders 2 and 3 initially have unequal pressure, gas will first predominantly be introduced into the bladder which has the lower pressure, as the check valves 16 and 18 are both in fluid communication with the output of the pump. Therefore, the operation of actuating the pump while keeping the 3/2-way valves 17 and 19 in the non-actuated state also serves to make the pressure in both bladders 2 and 3 equal by increasing pressure in the one of the bladders 2 and 3 which initially has a lower pressure. When the pressure in the two bladders 2 and 3 has been equalized, gas will be introduced to both bladders 2 and 3 while the pump is actuated. A mechanism may be provided that prevents the pressure in the bladders 2 and 3 from exceeding a given threshold during inflation.

When an amount of gas is to be decreased in both bladders 2 and 3, i.e., when both bladders 2 and 3 are to be deflated, the pump is not actuated while the two 3/2-way valves 17 and 19 are actuated. Gas is then discharged from the bladder 2 via the exhaust port of the first 3/2-way valve 17, and gas is discharged from the bladder 3 via the exhaust port of the second 3/2-way valve 19. When a desired pressure has been reached in the bladders 2 and 3, actuation of the respective 3/2-way valve is terminated. The bladders 2 and 3 may also be deflated individually by actuating the 3/2-way valve 17 or 19 respectively coupled to the bladder 2 or 3 which is to be deflated.

When one of the bladders 2, 3 is to be inflated while the other one of the bladders 2, 3 is to be deflated, the pump is actuated. The 3/2-way valve associated with the bladder that is to be inflated it not actuated, and the 3/2-way valve associated with the bladder that is to be deflated is actuated. For illustration, in order to inflate the first bladder 2 while simultaneously deflating the second bladder 3, the pump is actuated, the first 3/2-way valve 17 is not actuated and the second 3/2-way valve 19 is actuated. Similarly, in order to deflate the first bladder 2 while simultaneously inflating the second bladder 3, the pump is actuated, the first 3/2-way valve 17 is actuated and the second 3/2-way valve 19 is not actuated. A mechanism may be provided that prevents the pressure in the bladder from exceeding a given threshold pressure during inflation.

With the operations illustrated above, the functions desired in many seat adjusting devices may be implemented. For illustration, when the bladders 2 and 3 are arranged in a lower portion of a seat backrest so as to be offset relative to each other along the longitudinal direction of the backrest, the functions "increase curvature of the lumbar support" may be implemented by inflating both bladders 2 and 3, the function "decrease curvature of the lumbar support" may be implemented by deflating both bladders 2 and 3, the function "shift apex of the lumbar support upward" may be implemented by inflating bladder 2 while deflating bladder 3, and the function "shift apex of the lumbar support downward" may be implemented by deflating bladder 2 while inflating bladder 2. For further illustration, when the first bladder 2 is arranged in a lower portion of the seat backrest to implement a two-way lumbar support and a pair of second bladders 3 which are respectively coupled to the second port of the second 3/2-way valve 19 are provided at side bolsters of the seat, the function "increase curvature of lumbar support and increase volume of side bolsters" may be implemented by inflating both bladder 2 and the pair of bladders 3, the function "decrease curvature of lumbar support and decrease volume of side bolsters" may be implemented by deflating both bladder 2 and the pair of bladders 3, the function "increase curvature of lumbar support and decrease volume of side bolsters" may be implemented by inflating bladder 2 while deflating the pair of bladders 3, and the function "decrease curvature of lumbar support and increase volume of side bolsters" may be implemented by deflating bladder 2 while inflating the pair of bladders 3. For further illustration, when the bladders 2 and 3 are arranged in side bolsters of a seat backrest or in side bolsters of a seat portion at opposing sides of the seat, the functions "increase lateral support on both sides" may be implemented by inflating both bladders 2 and 3, the function "decrease lateral support on both sides" may be implemented by deflating both bladders 2 and 3, the function "increase support left and decrease support right" may be implemented by inflating bladder 2 while deflating bladder 3, and the function "decrease support left and increase support right" may be implemented by deflating bladder 2 while inflating bladder 2.

With reference to FIGS. 3-9, implementations of an air pressure source and valve assembly will be described that may be utilized in the adjusting device of FIG. 1 or the adjusting device of FIG. 2. In these embodiments, the air pressure source and valve assembly are respectively implemented as an integral pump and valve assembly device, provided in on combined housing.

Figure 3:
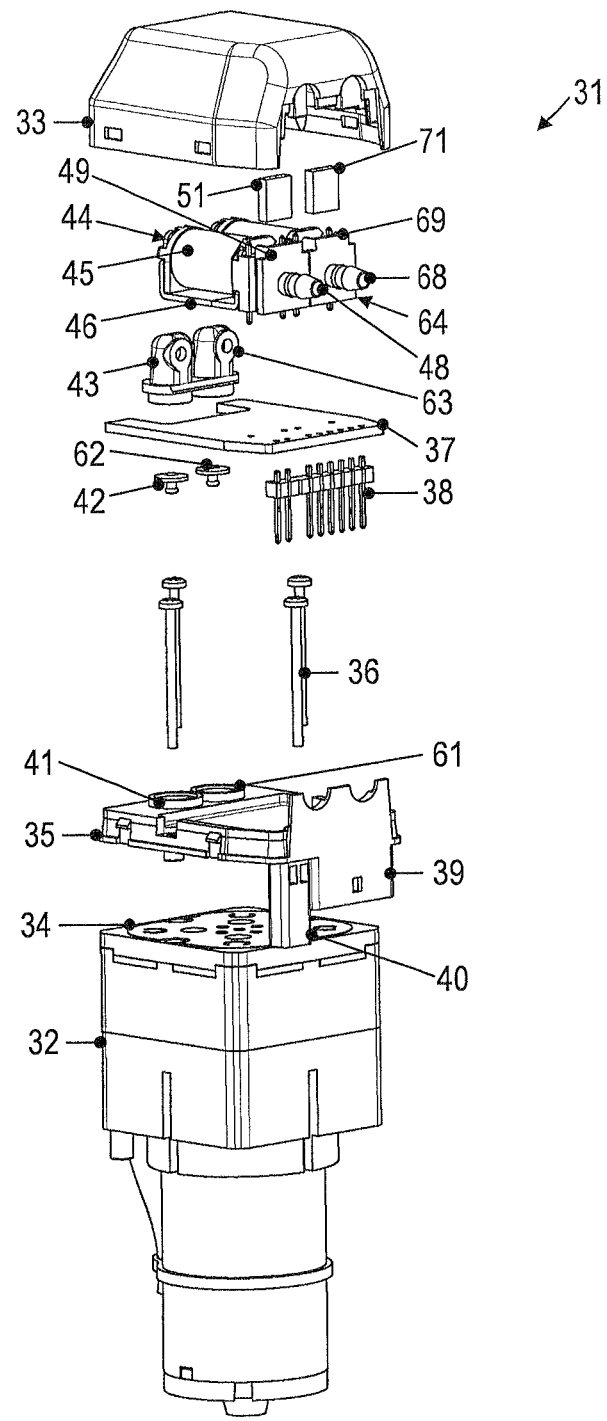
FIG. 3 is an exploded view of an integral pump and valve assembly device of an adjusting device according to an embodiment.
Figure 4:
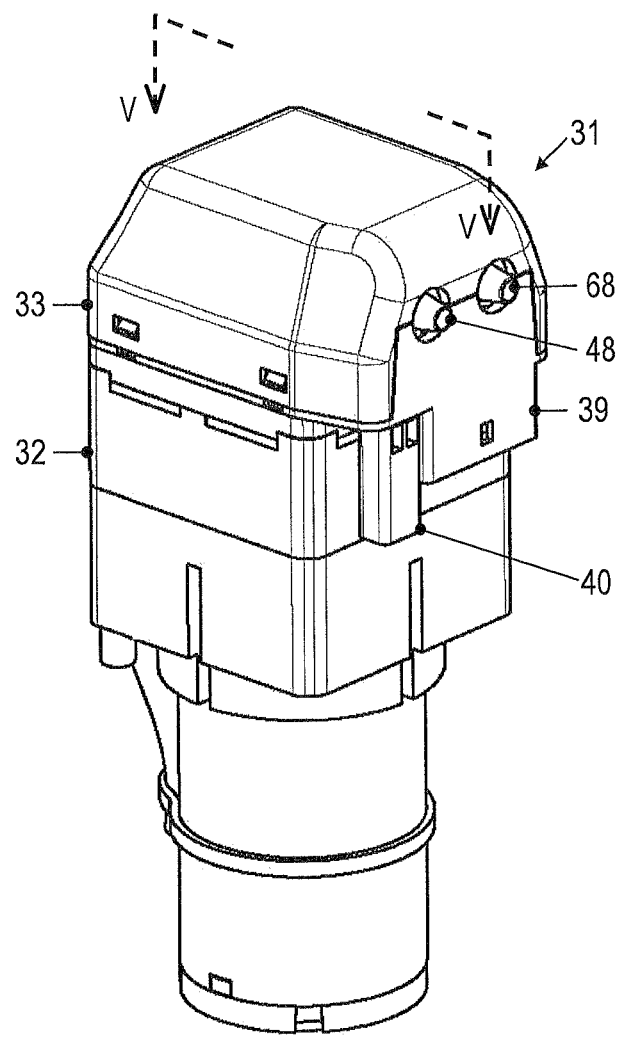
FIG. 4 is a perspective view of the integral pump and valve assembly device of FIG. 3.
Figure 5:
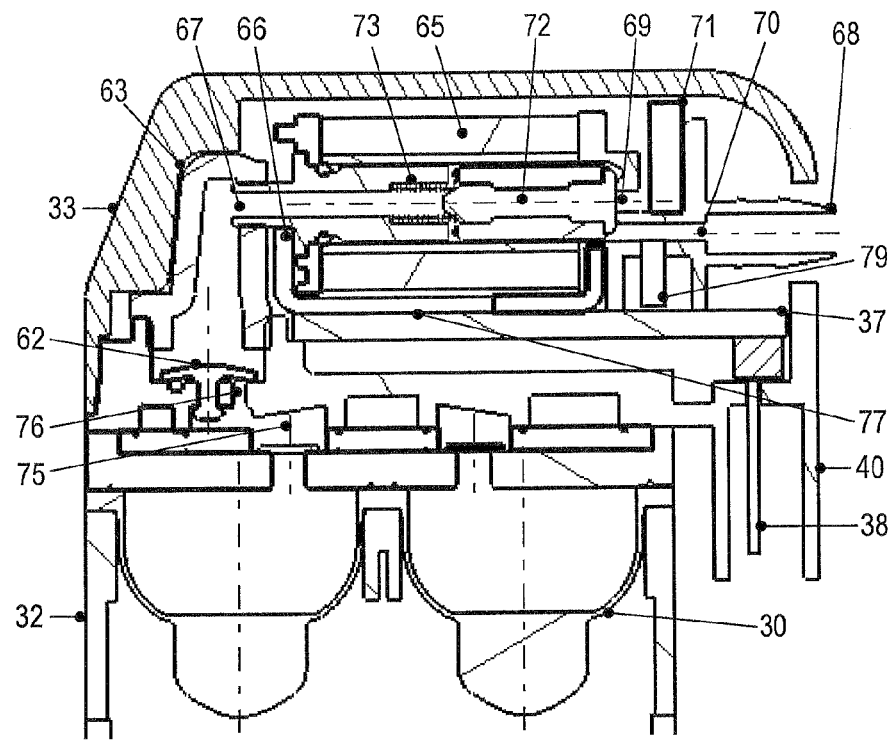
FIG. 5 is a sectional view of the integral pump and valve assembly device of FIG. 3 along the line V-V of FIG. 4.
Figure 6:
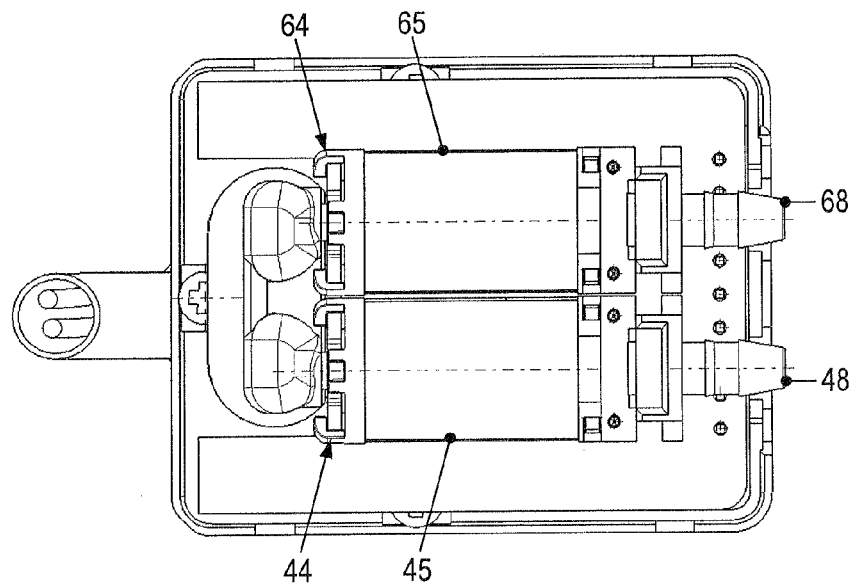
FIG. 6 is a top view of the integral pump and valve assembly device of FIG. 3 with a housing top broken away.

FIGS. 3-6 illustrate an integral pump and valve assembly device 31 that may be utilized in an adjusting device according to an embodiment. FIG. 3 shows an exploded view of the device 31, FIG. 4 shows an assembled perspective view, FIG. 5 shows a sectional view along the line V-V illustrated in FIG. 5 and FIG. 6 illustrates a top view with a top housing portion 33 broken way.

The device 31 has a first housing portion 32 and a second housing portion 33, which serves as housing cap of the pump housing. The componentry associated with the pump, which will also be referred to as pump portion, is generally disposed in a section of the interior of the housing which extends up to an axial end face 34 of the pump portion. The pump 30 is schematically illustrated in FIG. 5. An intermediate member 35 is arranged on the axial end face 34 of the pump portion and is fastened thereto by bolts 36. The intermediate member 35 has, at the side facing the pump portion 30, a stepped surface such that at least a portion of the intermediate member 35 abuts on the end face 34 when the intermediate member 35 is fastened to the end face 34, while another portion of the intermediate member 35 defines a cavity 75 between the end face 34 and the intermediate member 35. The cavity 75 serves as a fluid supply passage, from which gas may be supplied to a valve assembly integrated in the housing 32, 33. Claws are provided on an exterior surface of the intermediate member 35, which engage corresponding recesses in the second housing portion 33 when the second housing portion 33 is snapped onto the first housing portion 32 with the intermediate member 35 attached thereto. The first and second housing portions 32, 33 and the intermediate member 35 may be formed from a plastic material.

At an exterior circumference of the intermediate member 35, connector housings 39 and 40 are formed. The connector housings 39 and 40 are configured to matingly engage a corresponding plug to establish an electrical connection with a control circuit provided in the housing. Connector pins 38 extend into the cavities defined by the connector housings 39 and 40. The connector pins 38 are electrically coupled to a circuit board 37. The connector pins 38 may be mounted on the housing in a suitable manner. For illustration, a cross member formed of an insulating material may extend between the connector pins 38. The cross member may be received in a corresponding recess of the intermediate member 35. For illustration, and as best seen in FIG. 5, the cross member may be sandwiched between the intermediate member 35 and the circuit board 37.

Electrical components may be mounted on the circuit board 37 to implement a control circuit for the pump and valve assembly. The control circuit may include logical circuitry. The control circuit may have the functions explained with reference to the control circuit 12 of FIG. 1.

A valve assembly is provided in the housing defined by the housing portions 32, 33 and the intermediate member 35. The valve assembly includes a first check valve and a first electromagnetic 3/2-way valve coupled in series, and a second check valve and a second electromagnetic 3/2-way valve coupled in series. The first check valve and the first 3/2-way valve are connected parallel to the second check valve and the second 3/2-way valve. Each one of the 3/2-way valves has a first port, which will also be referred to as input port and which is coupled to the associated check valve to receive gas from the pump; a second port, which will also be referred to as supply port and which is in fluid communication with an inflatable fluid chamber via a fluid line; and a third port, which will also be referred to as exhaust port and which allows fluid to be discharged to atmosphere.

The first and second check valves are in fluid communication with the fluid supply passage 75 formed in between the intermediate member 35 and the end face 34 of the pump portion. The first and second check valves may be implemented as elastomeric valves. In the illustrated implementation, the first check valve includes a mushroom valve 42 received in a recess 41 of the intermediate member 35, and the second check valve includes a mushroom valve 64 received in a recess 61 of the intermediate member 35. The mushroom valves 42, 62 have a stem extending through the intermediate member, as best seen in FIG. 5. The mushroom valves are secured to the intermediate member 35 by an increased diameter portion of the stem that is arranged on the face of the intermediate member 35 facing the axial end face 34 of the pump portion. The mushroom valves 42 and 62 have a resilient sealing member which covers a passage 76 in the intermediate member 35 through which gas may pass from the fluid supply passage 75 to the side of the intermediate member 35 facing away from the axial end face 34 of the pump portion. When the pressure in the fluid supply passage 75 increases sufficiently, the mushroom valve 42 and/or 62 deforms resiliently, so as to open the passage 76. The mushroom valves 42 and 62 revert to the closed state due to the elastic return force, thereby closing the passage 76 again.

A first guide inset 43 guides gas that passes through the first mushroom valve 42 to a first port of the first 3/2-way valve 44. The first guide inset 43 serves as an output port of the first check valve. The first 3/2-way valve 44 includes a magnet coil 45 and a metallic frame 46 on which the magnet coil 45 is supported. The frame 46 generally has the shape of a C, with the longest side of the frame abutting on a portion 77 of the circuit board 37. The frame 46 forms part of the yoke of the solenoid of the first 3/2-way valve 44.

When the first 3/2-way valve 44 is not actuated, gas is allowed to pass between the first port and the second port of the first 3/2-way valve 44. In this state, an armature plunger disposed in the interior of the magnet coil 45 is biased by a biasing member, e.g. a spring, such that the third port of the first 3/2-way valve 44 is closed. A fluid line connector 48 is provided at the second port of the first 3/2-way valve 44, so that gas introduced into the first 3/2-way valve 44 via the first check valve may be output to a fluid line connected to the fluid line connector 48. The other end of the fluid line is coupled to the inflatable fluid chamber that is associated with the first 3/2-way valve 44. When the first 3/2-way valve 44 is actuated by energizing the solenoid, the armature plunger is moved against the biasing force of the biasing member when the magnet coil 45 is energized, and a third port 49 of the first 3/2-way valve 44 is opened, allow gas to flow between the second and third ports of the first 3/2-way valve 44. Gas can be discharged to atmosphere. An exhaust fluid guide member 51 is provided in proximity to the third port 49 of the first 3/2-way valve 44. The exhaust fluid guide member 51 is arranged and shaped such that gas discharged via the third port of the first 3/2-way valve 44 is directed to flow along the magnet coil 45.

The configuration of the second check valve and the second 3/2-way valve 64 is identical to the one of the first check valve and the first 3/2-way valve 44. A second guide inset 63 guides gas that passes through the second mushroom valve 62 to a first port of the second 3/2-way valve 64. The second guide inset 63 thereby serves as an output port of the second check valve. While the first and second guide insets 43 and 63 may be integrally formed, they are not in fluid communication with each other. The second 3/2-way valve 64 includes a magnet coil 65 and a metallic frame 66 on which the magnet coil 65 is supported. The frame 66 generally has the shape of a C, with the longest side of the frame abutting on a portion 77 of the circuit board 37. The frame 66 forms part of the yoke of the solenoid of the second 3/2-way valve.

When the second 3/2-way valve 64 is not actuated, gas is allowed to pass between the first port 67 and the second port 70 of the second 3/2-way valve 64. In this state, an armature plunger 72 disposed in the interior of the magnet coil 65 is biased by a biasing member, e.g. a spring 73, such that the third port 69 of the second 3/2-way valve 64 is closed. A fluid line connector 68 is provided at the second port 70 of the second 3/2-way valve 64, so that gas introduced into the second 3/2-way valve 64 via the first second valve may be output to a fluid line connected to the fluid line connector 68. The other end of the fluid line is coupled to the inflatable fluid chamber that is associated with the second 3/2-way valve 64. When the second 3/2-way valve 64 is actuated by energizing the magnet coil 65, the armature plunger 72 is moved against the biasing force of the biasing member 73 and the third port 69 of the first 3/2-way valve 64 is opened. Gas is allowed to flow between the second port 70 and the third port 69, and can be discharged to atmosphere. An exhaust fluid guide member 71 is provided in proximity to the third port 69 of the second 3/2-way valve 64. The exhaust fluid guide member 71 is arranged and shaped such that gas discharged via the third port of the second 3/2-way valve 64 is directed to flow along the magnet coil 65.

Pressure sensors may be integrated into the valve assembly to sense the pressure in the fluid chambers associated with the respective valves. For illustration, a first pressure sensor may be provided to sense a pressure at the second port of the first 3/2-way valve 44, and a second pressure sensor 79 may be provided to sense a pressure at the second port 70 of the second 3/2-way valve 64. The pressure sensors may be electrically coupled to the circuit board 37 to provide signals indicative of the measured pressure values to the control circuit. The pressure sensors may also be mounted on the circuit board 37.

A securing device may be provided at the housing portion 33 and/or the intermediate member 35 to releasably secure a fluid line connected to the fluid line connector 48 on the fluid line connector 48, and to releasably secure a fluid line connected to the fluid line connector 68 on the fluid line connector 68. The securing device may include a set of hooks or claws disposed circumferentially around the respective fluid line connector 48 or 68 so that a fluid line may be inserted in between the hooks or claws and the respective fluid line connector 48 or 68, and a ring which is moveable relative to the respective fluid line connector. The ring may be configured to force the hooks or claws out of engagement with the fluid line when the ring is moved in a first direction.

The integral pump and valve assembly device 31 may be provided with a shell of foam material which has passages for the electrical and fluid lines to be coupled to the device 31. The shell serves both to protect the device 31 and to reduce the noise emitted from the device 31.

An adjusting device which includes the integral pump and valve assembly device 31 may be readily mounted in a seat, due to the high degree of integration of components afforded by the device 31, in which the valve assembly is integrated in the pump head. For illustration, in order to mount an adjusting device having two fluid chambers coupled to the integral pump and valve assembly device 31 in a seat, the fluid chambers may be positioned on the seat at the desired positions, fluid lines connected to the fluid chambers may be connected to the fluid line connectors 48, 68 of the integral pump and valve assembly device 31, and the integral pump and valve assembly device 31 may be mounted on the seat.

The frames 46, 66 on which the magnet coils of the first and second 3/2-way valves 44, 64 are mounted may serve as a heat sink when the magnet coil of one or both 3/2-way valves is energized. As best seen in FIGS. 3 and 6, the frames 46 and 66 are disposed proximal to each other. The portion 77 of the board 37 on which the frames 46 and 66 abut may be configured to have a high heat conductivity. In an embodiment, the portion 77 of the board 37 may be provided with a coating of a material having a high heat conductivity, e.g., a metallic coating. If required, the portion 77 of the board 37 may be separated from the portion of the circuit board 37 which carries components of the control circuit to reduce the risk of temperature-induced damage to electrical components of the control circuit.

Gas is discharged from the third ports of the 3/2-way valves only when the magnet coils 45, 65 are energized. When gas is discharged, the exhaust fluid guide member 51, 71 provided on the respective valve directs the discharged fluid so that it passes along the magnet coil of the respective 3/2-way valve. The control circuit provided on the board 37 may be configured such that actuation of a 3/2-way valve is stopped when the pressure in the fluid chamber has reached ambient pressure. Thereby, the exhaust fluid assists in cooling the magnet coils.

Figure 7:
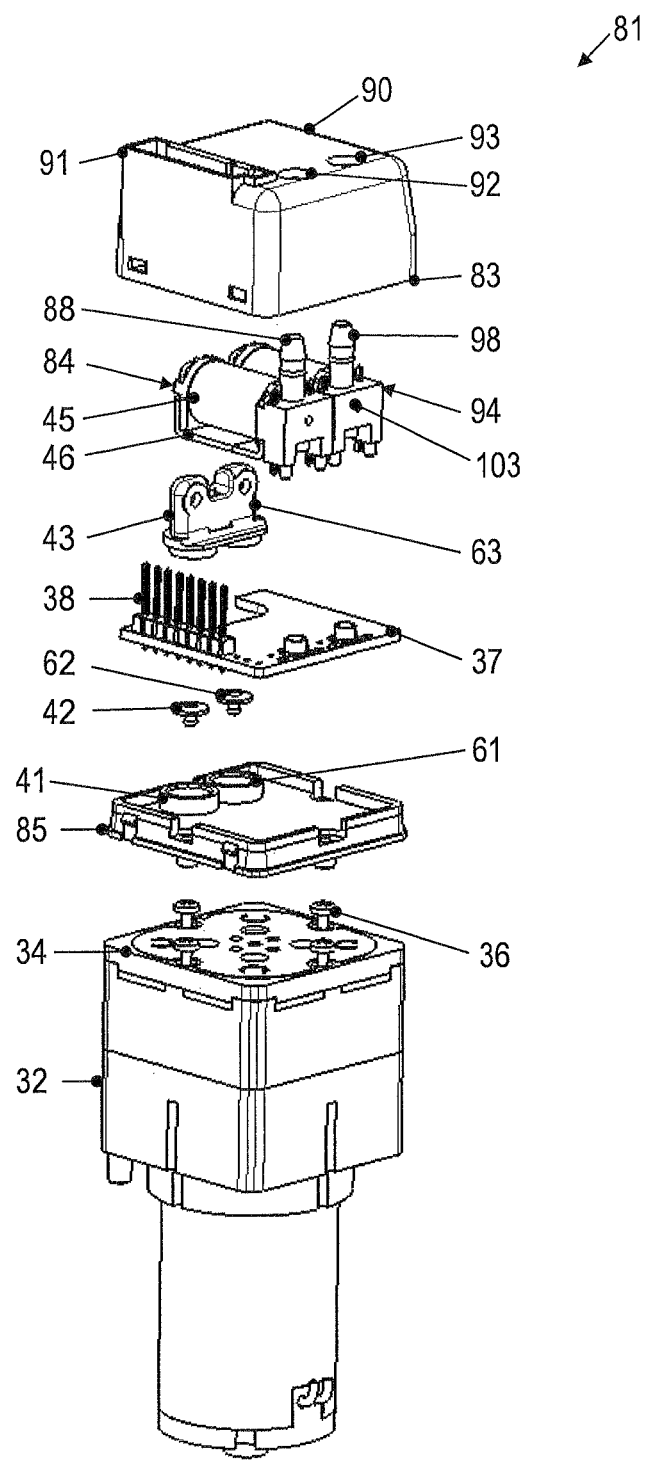
FIG. 7 is an exploded view of an integral pump and valve assembly device of an adjusting device according to another embodiment.
Figure 8:
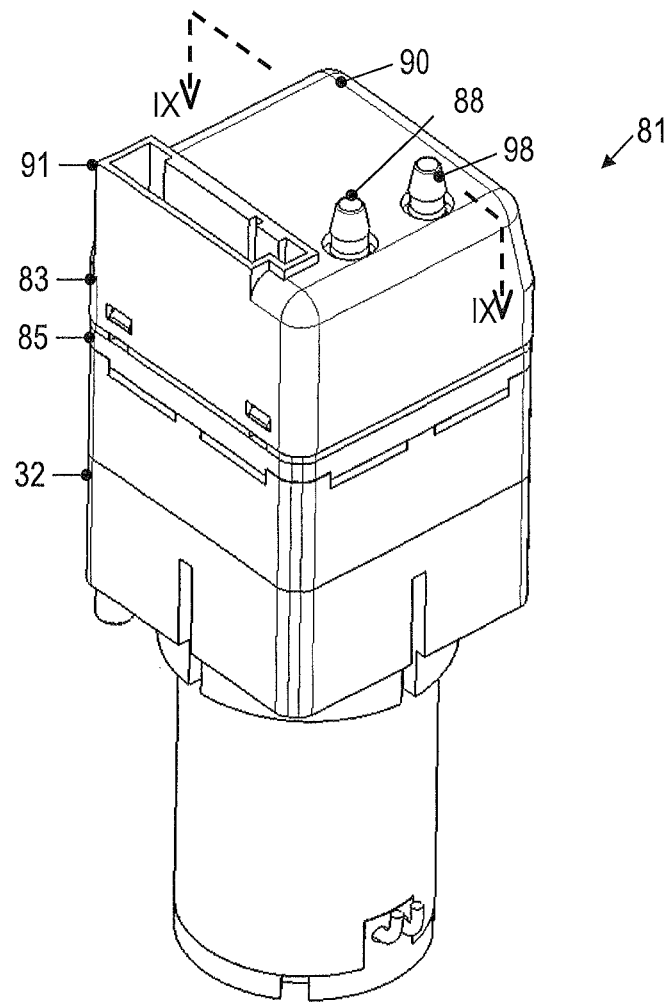
FIG. 8 is a perspective view of the integral pump and valve assembly device of FIG. 7.
Figure 9:
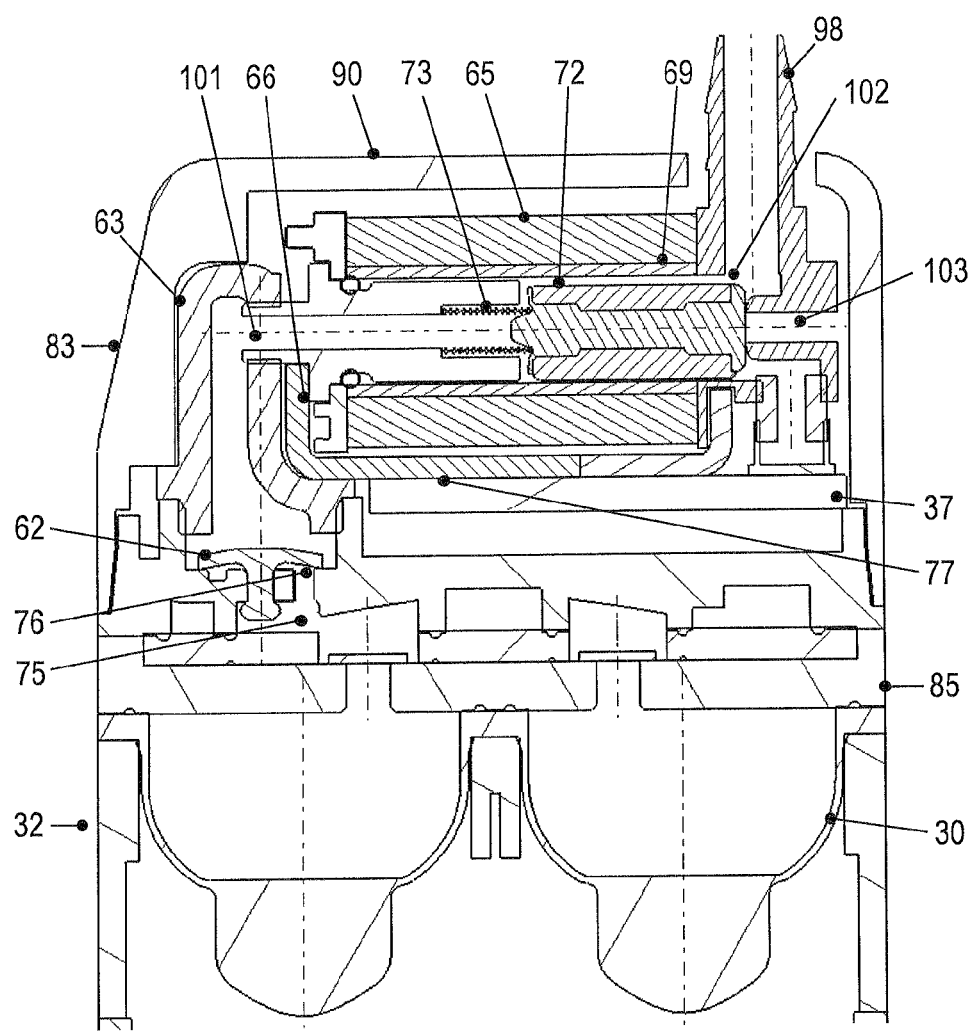
FIG. 9 is a sectional view of the integral pump and valve assembly device of FIG. 7 along the line IX-IX of FIG. 8.

FIGS. 7-9 illustrate an integral pump and valve assembly device 81 that may be utilized in an adjusting device according to another embodiment. FIG. 7 shows an exploded view of the device 81, FIG. 8 shows an assembled perspective view, and FIG. 9 shows a sectional view along the line IX-IX illustrated in FIG. 8.

The device 81 has a pump portion with a first housing portion 32 and a second housing portion 83, which serves as housing cap of the pump housing. The componentry associated with the pump, which will also be referred to as pump portion, is generally disposed in a section of the interior of the housing which extends up to an axial end face 34 of the pump portion. An intermediate member 85 is arranged on the axial end face 34 of the pump portion and is fastened thereto by bolts 36. The intermediate member 85 and the axial end face 34 of the pump portion define a fluid supply passage 75 provided therebetween, from which pressurized gas may be supplied to a valve assembly that is also integrated into the housing formed of the housing portions 32 and 83 and the exterior circumference of the intermediate member 85. Further, a circuit board 37 on which a control circuit is provided is also integrated in the device 81 and provided in the interior of the housing. Pressure sensors may be provided on the circuit board to monitor pressures in the fluid chambers.

The configuration and operation of the valve assembly corresponds generally to the configuration and operation of the valve assembly of the device 31. Members and elements of the device 81 that correspond to members of the device 31 with regard to operation and construction are designated by the same reference numerals. As will be explained in more detail below, the device 81 provides an alternative arrangement of the ports of the 3/2-way valves, an alternative arrangement of the fluid line connector and an alternative arrangement of the connector housing and connector pins.

The second housing portion 83 of the device 81 is configured as an end cap of the housing. The second housing portion 83 includes an axial end face 90 of the housing, which is disposed perpendicular to a longitudinal axis of the housing. A recess 91 is formed on the second housing portion 83, which serves as a connector housing. The connector housing is configured to matingly receive a mating plug to supply signals or power to the control circuit. The connector pins 38, which are electrically coupled to and mounted on the circuit board 37, protrude into the connector housing 91. The axial end face 90 has cut-outs 92, 93 through which fluid line connectors 88, 98 extend.

The valve assembly includes a first 3/2-way valve 84 having a first port in fluid communication with the fluid guide inset 43, to which gas passing the first check valve 42 is supplied. The valve assembly also includes a second 3/2-way valve 94 having a first port 101 in fluid communication with the fluid guide inset 63, to which gas passing the second check valve 62 is supplied. The configuration and operation of the first and second 3/2-way valves 84, 94 generally correspond to the configuration and operation of the first and second 3/2-way valves 44, 64 of the device 31. The first and second 3/2-way valves 84, 94 are distinguished from the first and second 3/2-way valves 44, 64 of the device 31 in the arrangement of the second and third port. As best seen in FIG. 9, the 3/2-way valves 84, 94 are configured such that the third port 103, through which fluid may be discharged to atmosphere, is arranged essentially along an axial direction of the magnet coil 65. The second port 102, through which gas may be supplied to the fluid chamber associated with the respective 3/2-way valve and through which gas may pass from the fluid chamber to the third port 103 when the magnet coil is energized, is disposed toward the axial end face 90 of the housing. The fluid line connector 88 is provided at the second port of the first 3/2-way valve 84. The fluid line connector 98 is provided at the second port of the second 3/2-way valve 94. The fluid line connectors 88 and 98 extend from the second port of the associated 3/2-way valve toward the axial end face 90. In the illustrated implementation, the fluid line connectors 88 and 98 extend through the recesses 92 and 93, respectively, in the axial end face 90 to facilitate attachment of a fluid line.

A securing device may be provided at the housing portion 83 and/or the intermediate member 85 to releasably secure a fluid line connected to the fluid line connector 88 on the fluid line connector 88, and to releasably secure a fluid line connected to the fluid line connector 98 on the fluid line connector 98. The securing device may include a set of hooks or claws disposed circumferentially around the respective fluid line connector 88 or 98 so that a fluid line may be inserted in between the hooks or claws and the respective fluid line connector 88 or 98, and a ring which is moveable relative to the respective fluid line connector. The ring may be configured to force the hooks or claws out of engagement with the fluid line when the ring is moved in a first direction.

The operation of the 3/2-way valves is as follows. In the rest position shown in FIG. 9, a bias member 73, e.g., a spring, biases an armature plunger 72 in an axial direction, so that the third port 103 is closed. The armature plunger is provided such that, in this state, fluid may pass from the first port 101 to the second port 102 of the 3/2-way valve. When the magnet coil 65 is energized, the armature plunger 72 is moved against the biasing force of the bias member 73 so that the third port 103 is opened. In this state, the second port 102 is in fluid communication with the third port 103. When the pressure in the fluid chamber connected to the 3/2-way valve is larger than ambient pressure, gas is discharged from the fluid chamber through the third port 103. The third port 103 is arranged such that gas is discharged from the 3/2-way valve at a position located in the interior of the housing.

While only the second check valve and the second 3/2-way valve are shown in the cross-sectional view of FIG. 9, the first check valve and the first 3/2-way valve may have an identical configuration.

In the device 81, the C-shaped frames 46 and 66 on which the magnet coils 45, 65 of the 3/2-way valves are supported may again be operative as heat sinks. The frames 46 and 66 may abut on a portion 77 of the circuit board 37 which has a high heat conductivity, so that heat may be transferred between the frames 46 and 66.

While the device 81 does not include dedicated exhaust fluid guides, as gas is discharged from the fluid chambers to atmosphere via the third ports 103 of the 3/2-way valves provided in the interior of the housing, the resulting gas flow in the interior of the housing will assist in cooling the magnet coil when the 3/2-way valve is actuated. Alternatively, exhaust fluid guides may be provided at the third ports 103 of the 3/2-way valve to direct the gas discharged through the third port 103 along an exterior portion of the associates 3/2-way valve.

In the device 81, both the electrical connector formed by the pins 38 and the connector housing 91 and the fluid line connectors 88, 98 are provided at the axial end face 90. This position is frequently convenient for attachment of fluid lines and electrical lines. Further, as both the electrical lines and the fluid lines extend in the same direction from the housing portion 83, encapsulating the device 81 in a foam material is facilitated.

The integral pump and valve assembly devices 31 and 81 may be utilized in various adjusting devices that have one or plural inflatable chambers in fluid communication with the valve assemblies of the integral pump and valve assembly device. As has been explained with reference to FIGS. 1 and 2, the pump and the two 3/2-way valves may be controlled such that both fluid chambers may be inflated by actuating the pump to supply pressure gas, while the 3/2-way valves are not actuated; that both fluid chambers may be deflated by actuating both 3/2-way valves; and that one fluid chamber may be inflated while the other fluid chamber may be deflated by actuating the 3/2-way valve in fluid communication with the fluid chamber that is to be deflated, while actuating the pump and maintaining the other 3/2-way valve in the non-actuated state. Possible implementations of such adjusting devices are a four-way lumbar support or a combined two-way lumbar in combination with a side bolster support, without being restricted thereto.

While adjusting devices according to various embodiments have been described, various modifications may be implemented in other embodiments. For illustration, while an adjusting device having two inflatable fluid chambers and two combinations of 3/2-way valves and check valves respectively associated with one of the fluid chambers have been described, according to embodiments, the adjusting device may include only one inflatable fluid chamber coupled to a pressure fluid source via a 3/2-way valve and a check valve. For illustration, the adjusting device may be a two-way lumbar support device having only one inflatable bladder, or a side bolster adjusting device in which the side bolsters are adjusted in a symmetrical manner. For further illustration, according to embodiments, the adjusting device may include at least three, e.g., three, four or more, inflatable chambers. The valve assembly may include one 3/2-way valve for each of the fluid chambers and in fluid communication with one of the fluid chambers, and a check valve for each of the fluid chambers which is connected in between a fluid pressure source and the associated 3/2-way valve. For illustration, the adjusting device may be a four-way lumbar support device including more than three inflatable bladders, or the adjusting device may be a combination of a four-way lumbar support device including at least two inflatable bladders and a side bolster support in which both side bolster are adjusted in a symmetrical manner, or the adjusting device may be a combination of a four-way lumbar support device including at least two inflatable bladders and a side bolster support that allows the two side bolster to be inflated to different degrees.

While, in the context of adjusting devices or integral pump and valve assembly devices comprised by such adjusting devices, specific implementations of check valves and electrically controllable 3/2-way valves have been described, other implementations of check valves and electrically controllable 3/2-way valves may be utilized in other embodiments. For illustration rather than limitation, in each aspect or embodiment, the 3/2-way valve(s) of the adjusting devices or of the integral pump and valve assembly devices may be electrically controllable 3/2-way valves that include a suitable actuator, for example, 3/2-way valves having a piezoelectric actuator, memory-wire actuated 3/2-way valves, or 3/2-way valves having an actuator which includes one or plural plastic materials which are responsive to an electrical signal, e.g., by changing their shape or volume responsive to an applied voltage or current While integral pump and valve assembly devices have been described in which the electrical connector and fluid line connectors are provided at the same face of the housing of the integral pump and valve assembly device, the electrical connector and the fluid line connectors may also be provided at different faces. Further, plural fluid line connectors may protrude from the housing at different faces of the housing to facilitate connections to fluid chambers that are provided in different directions relative to the integral pump and valve assembly devices. As the housing portions are formed of a plastic materials, configuration changes that are necessary to accommodate different design constraints of different OEMs can be readily made by adjusting the molding tooling.

Additional components may be integrated into the integral pump and valve assembly devices. For illustration, the connector housing may be formed such that it can receive an adapter. An adapter may be inserted into the connector housing, the adapter being selected in dependence on the electrical connections used in the products in which the adjusting device is to be used. The adapter may have a first portion configured to matingly engage the connector pins of the integral pump and valve assembly device, and a second portion configured to matingly engage the connector design used by the OEM. For further illustration, a mechanism may be provided that prevents the pressure in a fluid chamber from exceeding a given threshold in the process of inflating the fluid chamber.

While integral pump and valve assembly devices have been described in which the electrical connector is configured as male part of an electrical connection, the electrical connector of the integral pump and valve assembly device may be configured as a female connector in other embodiments.

While integral pump and valve assembly devices have been described in which logical components of a control circuit are provided in the interior of the housing of the fluid pressure source, the control circuit may also be provided externally of the housing. For illustration, the control circuit may be implemented in an onboard computer of a vehicle that supplies, via the circuit board and connector pins of the integral pump and valve assembly device, control signals to the valve assembly and pump. In other implementations, the pump may be separately connected to a board network.

While pumps and valve assemblies have been described in which the valve assembly is integrated into a pump housing, in other embodiments, the valve assembly may also be provided separately from the pump, e.g., in a dedicated valve assembly housing.

While exemplary embodiments have been described in the context of lumbar support adjustment in the backrest of a vehicle seat and in the context of side bolster supports of a vehicle seat, embodiments of the invention are not limited to this particular field of application. Rather, embodiments of the invention may be advantageously employed to adjust supports in a wide variety of seats.

What is claimed is:

1. An adjusting device for a seat, in particular for a vehicle seat, the adjusting device comprising:
at least one fluid chamber, wherein each fluid chamber of said at least one fluid chamber is configured to be installed in said seat to adjust at least a portion of said seat, and wherein each fluid chamber of said at least one fluid chamber is inflatable;
a pressure fluid source; and
a valve assembly in fluid communication with said at least one fluid chamber, wherein said at least one fluid chamber comprises a first fluid chamber, and wherein said valve assembly comprises a check valve and a 3/2-way valve, said check valve being connected in between the pressure fluid source and said 3/2 way valve, wherein a first port of said 3/2-way valve is in fluid communication with said check valve and wherein a second port of said 3/2-way valve is in fluid communication with said first fluid chamber,
wherein the pressure fluid source includes a housing, wherein an output port of said pressure fluid source is in fluid communication with said check valve, and wherein said valve assembly is arranged in an interior of said housing and is integrated into a pump head.

2. The adjusting device of claim 1, further comprising an electrical control circuit having an input to receive a signal, wherein said control circuit is coupled to said pressure fluid source and to said valve assembly and is configured to control said pressure fluid source and said valve assembly responsive to said received signal, and wherein said control circuit is arranged in said interior of said housing.

3. An adjusting device for a seat, the adjusting device comprising:
at least one fluid chamber, wherein each fluid chamber of said at least one fluid chamber is configured to be installed in said seat to adjust at least a portion of said seat, and wherein each fluid chamber of said at least one fluid chamber is inflatable and wherein said at least one fluid chamber comprises a first fluid chamber;
a valve assembly in fluid communication with said at least one fluid chamber, wherein said valve assembly comprises a check valve and a 3/2-way valve, wherein a first port of said 3/2-way valve is in fluid communication with said check valve and wherein a second port of said 3/2-way valve is in fluid communication with said first fluid chamber;
a pressure fluid source having a housing, wherein an output port of said pressure fluid source is in fluid communication with said check valve, and wherein said valve assembly is arranged in an interior of said housing;
an electrical control circuit having an input to receive a signal, wherein said control circuit is coupled to said pressure fluid source and to said valve assembly and is configured to control said pressure fluid source and said valve assembly responsive to said received signal, and wherein said control circuit is arranged in said interior of said housing; and
an electrical connector having at least one connector pin coupled to said control circuit and a connector housing, wherein said connector housing is formed as a portion of said housing of said pressure fluid source.

4. The adjusting device of claim 3, wherein said housing of said pressure fluid source has an axial end face, wherein said at least one connector pin extends at said axial end face and parallel to a longitudinal axis of said housing.

5. The adjusting device of claim 1, wherein said 3/2-way valve has a third port for discharging fluid from said first fluid chamber to atmosphere, wherein said third port is arranged in said interior of said housing to discharge said fluid from said first fluid chamber into said housing.

6. The adjusting device of claim 1, comprising a fluid line connector provided on said second port of said 3/2-way valve, wherein an axial end face of said housing of said pressure fluid source has a recess and said fluid line connector is arranged at said recess.

7. The adjusting device of claim 1, wherein said 3/2-way valve is electromagnetically actuable and has a third port for discharging fluid from said first inflatable fluid chamber, and wherein said adjusting device comprises a fluid guide device configured to direct fluid discharged via said third port along a portion of said 3/2-way valve at which power is dissipated when said 3/2-way valve is actuated.

8. The adjusting device of claim 1, further comprising a pressure sensor, wherein said pressure sensor is arranged to sense a pressure at said second port of said 3/2-way valve.

9. An adjusting device for a seat, the adjusting device comprising:
at least one fluid chamber, wherein each fluid chamber of said at least one fluid chamber is configured to be installed in said seat to adjust at least a portion of said seat, and wherein each fluid chamber of said at least one fluid chamber is inflatable; and
a valve assembly in fluid communication with said at least one fluid chamber, wherein said at least one fluid chamber comprises a first fluid chamber and a second fluid chamber, wherein said valve assembly comprises
a check valve and a 3/2-way valve, wherein a first port of said 3/2-way valve is in fluid communication with said check valve and wherein a second port of said 3/2-way valve is in fluid communication with said first fluid chamber, and
a further check valve and a further 3/2-way valve, wherein a first port of said further 3/2-way valve is in fluid communication with said further check valve and wherein a second port of said further 3/2-way valve is in fluid communication with said second fluid chamber.

10. The adjusting device of claim 9, wherein said 3/2-way valve comprises one one solenoid having a yoke, and wherein said further 3/2-way valve comprises one further solenoid having a further yoke, wherein said adjusting device is configured such that heat is transferred between said yoke and said further yoke when one of said 3/2-way valve and said further 3/2-way valve is actuated.

11. The adjusting device of claim 10, further comprising a heat transfer member in contact which both said yoke and said further yoke.

12. The adjusting device of claim 1, wherein said adjusting device is configured as an adjusting device for at least one of a lumbar support, a four-way lumbar support, or a side bolster support.

13. A method of operating an adjusting device for a seat, in particular for a vehicle seat, wherein said adjusting device comprises at least one inflatable fluid chamber installed in said seat, a pressure fluid source including a housing, and a valve assembly in fluid communication with said at least one inflatable fluid chamber, wherein said at least one inflatable fluid chamber comprises a first inflatable fluid chamber, said method comprising:
controlling the pressure fluid source and said valve assembly in dependence on whether said first fluid chamber is to be inflated or deflated, wherein
if said first fluid chamber is to be inflated, said pressure fluid source is actuated to supply fluid to said first fluid chamber via a check valve and a 3/2-way valve of said valve assembly, said check valve being connected in between said pressure fluid source and said 3/2 way valve, wherein an output port of said pressure fluid source is in fluid communication with said check valve, and wherein said valve assembly is arranged in an interior of said housing and is integrated into a pump head, and
if said first fluid chamber is to be deflated, electrical power is supplied to said 3/2-way valve to actuate said 3/2-way valve such that fluid is discharged to atmosphere from said first fluid chamber via said 3/2-way valve.

14. The adjusting device of claim 1, wherein said pressure fluid source is a pump.

15. The adjusting device of claim 1, wherein said check valve is a passive valve.

* * * * *